United States Patent [19]

LeVeux

[11] 4,281,853
[45] Aug. 4, 1981

[54] SEAT BELT RESTRAINING APPARATUS

[75] Inventor: Bernard LeVeux, Vauhallan, France

[73] Assignee: Regie Nationale des Usines Renault, Boulogne-Billancourt, France

[21] Appl. No.: 81,162

[22] Filed: Oct. 2, 1979

[30] Foreign Application Priority Data

Oct. 25, 1978 [FR] France .................. 78 30294

[51] Int. Cl.³ .................................... B60R 21/40
[52] U.S. Cl. .................................... 280/804
[58] Field of Search .................. 280/804, 802, 808

[56] References Cited

U.S. PATENT DOCUMENTS

| 3,757,064 | 9/1973 | Ogawa | 280/804 |
| 3,830,518 | 8/1974 | Silber | 280/804 |
| 3,833,239 | 9/1974 | Coenen | 280/804 |
| 3,889,971 | 6/1975 | Kazaoka | 280/804 |

FOREIGN PATENT DOCUMENTS

| 2306224 | 9/1973 | Fed. Rep. of Germany . |
| 2552862 | 6/1976 | Fed. Rep. of Germany . |
| 2522415 | 12/1976 | Fed. Rep. of Germany . |
| 2643818 | 3/1978 | Fed. Rep. of Germany . |

Primary Examiner—Robert R. Song
Attorney, Agent, or Firm—Oblon, Fisher, Spivak, McClelland & Maier

[57] ABSTRACT

A seat belt restraining apparatus for vehicles which frees access to the seat of the user when the door of the vehicle is open and which closes over the body of the user while the door is closed is disclosed. This apparatus is characterized by the fact that it uses a movable anchorage affixed to the extremity of a flexible rack and movable by the force of a motor.

5 Claims, 8 Drawing Figures

SEAT BELT RESTRAINING APPARATUS

BACKGROUND OF THE INVENTION

1. Field of the Invention

The present invention concerns a seat belt restraining apparatus particularly designed for automotive vehicles, of the type which automatically frees access to a seat when the door is open and closes automatically over the body of the occupant of the seat when the door is closed. The apparatus possesses at least one upper lateral anchorage at one extremity of the belt and a lower anchorage at another extremity of the belt, extending laterally with regard to said door, a guide support for the upper lateral anchorage, and an element for carrying the movable anchorage along said guide support.

2. Description of the Prior Art

It has been well known to anchor a seat belt in a fixed point on an automobile. However, recently it has become desirable to provide a seat belt which will automatically free access to the seat when the door is opened but which automatically closes over the seat occupant when the door closes. Attempts to do so in the past have resulted in complex arrangements with exposed guide supports.

SUMMARY OF THE INVENTION

The purpose of the invention is to achieve a substantial simplification of the operation of a seat belt apparatus of the type described above.

Another purpose of the invention is to achieve a door frame which will hide the guide support of the upper lateral anchorage.

According to the invention, these purposes are attained by the fact that the door frame is formed by a section of reinforcing bar which possesses a surface, for support of the guide support, equipped with two connecting lips integral respectively with the corresponding lips of the windshield post, the longitudinal reinforcing bar of the roof, and the lateral roof post, and that the carrying element for the movable anchorage is affixed to the extremity of a flexible rack which moves by the force of a motor.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENTS

Figure 1:
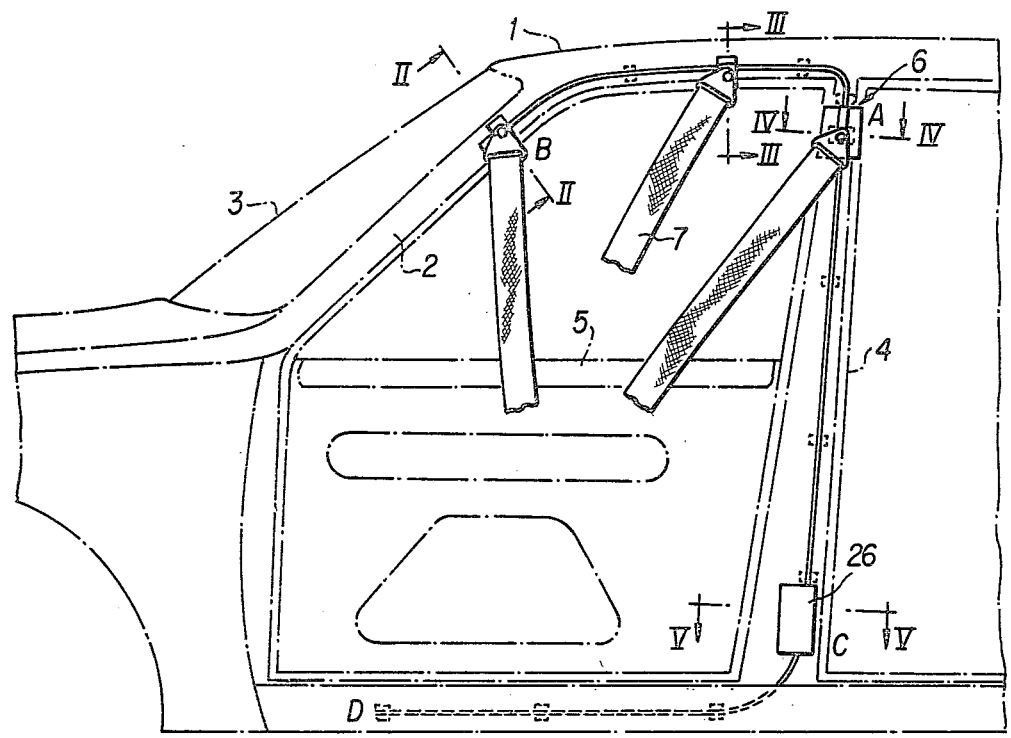
FIG. 1 is an elevation of a part of the body of an automobile equipped with the retaining apparatus of the invention.

FIG. 1 shows the roof 1, post 2 of windshield 3, lateral post 4 of roof 1, and lateral door 5. It should be noted that the interior trim panels of door 5, post 4, and roof 1 have been removed so as to better represent the apparatus of the invention.

The apparatus, as represented, possesses an upper lateral anchorage 6 for one extremity of seat belt 7.

Lateral anchorage 6 is affixed to the frame of door 5 through a guide path. The latter enables attainment of an advanced position of anchorage 6, which automatically frees access to the seat when the door of the vehicle is opened. In contrast, when door 5 of the vehicle is closed, anchorage 6 assumes a backing off position, along lateral post 4, and automatic application of seat belt 7 over the body of the occupant of the seat is obtained.

To be suitable for such a mode of operation, the frame of door 5 is formed by a hollow body formed by an assembly of sheet metal elements.

Figure 2:
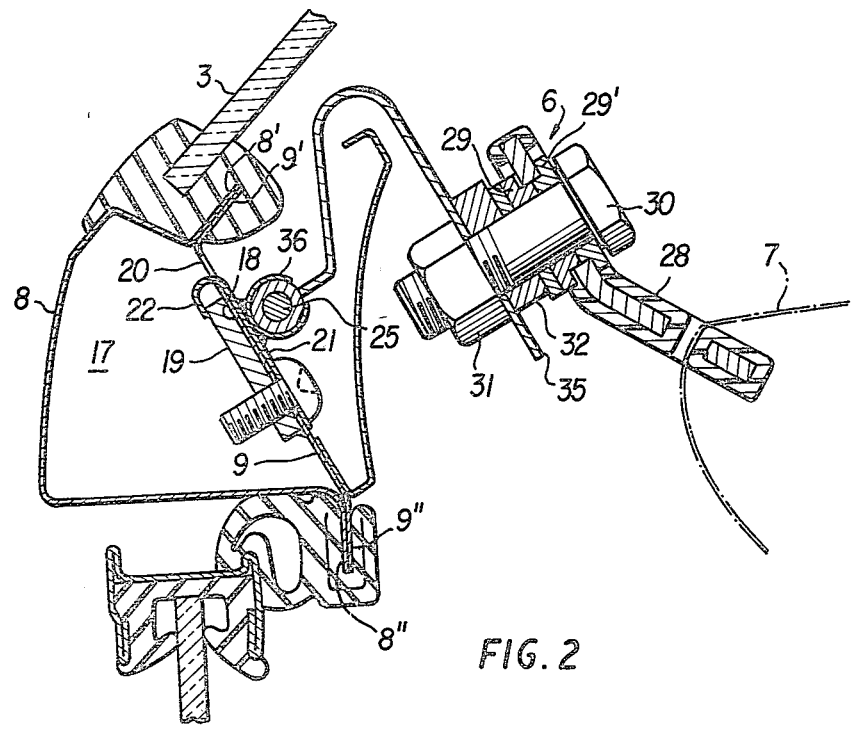
FIG. 2 is a cutaway along the plane defined by line II—II of FIG. 1.

According to FIG. 2, which shows a cutaway of post 2 of windshield 3, it can be seen that post 2 is formed by an outer metal sheet 8 and an inner sheet 9. Outer sheet 8 possesses two connecting lips 8', 8" integral respectively with corresponding connecting lips 9' and 9" by means of solder points.

Figure 3:
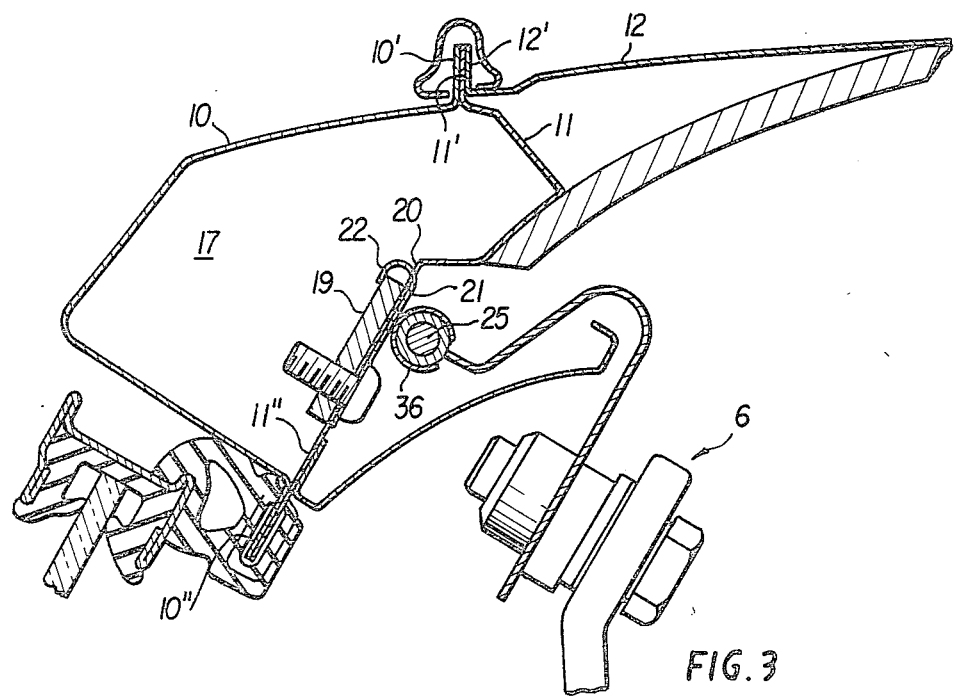
FIG. 3 is a cutaway along the plane defined by line III—III of FIG. 1.

According to FIG. 3, which shows the longitudinal reinforcing bar of the roof, it can be seen that said bar is composed of an outer metal sheet 10 and a inner sheet 11. Outer metal sheet 10 possesses a raised lip 10' intended to be connected to corresponding raised lip 12' of sheet 12 of roof 1. Lips 10' and 12' are located on either side of a connecting lip 11' of inner sheet 11, of which the opposite lip 11" is soldered to the corresponding lip 10" of sheet 10.

Figure 4:
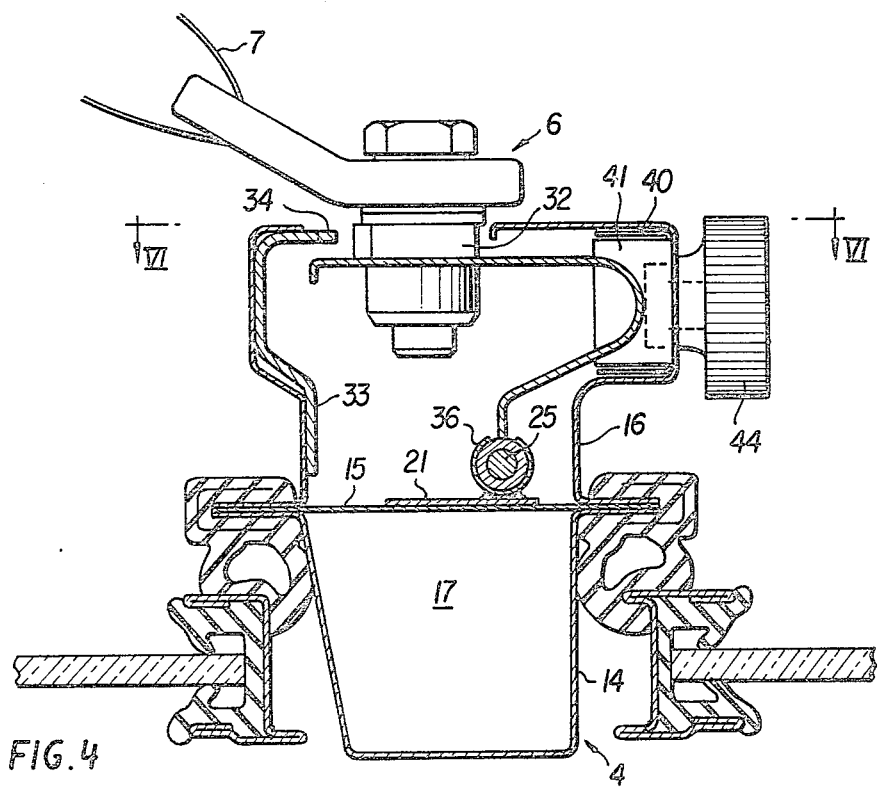
FIG. 4 is a cutaway along the plane defined by line IV—IV of FIG. 1.
Figure 5:
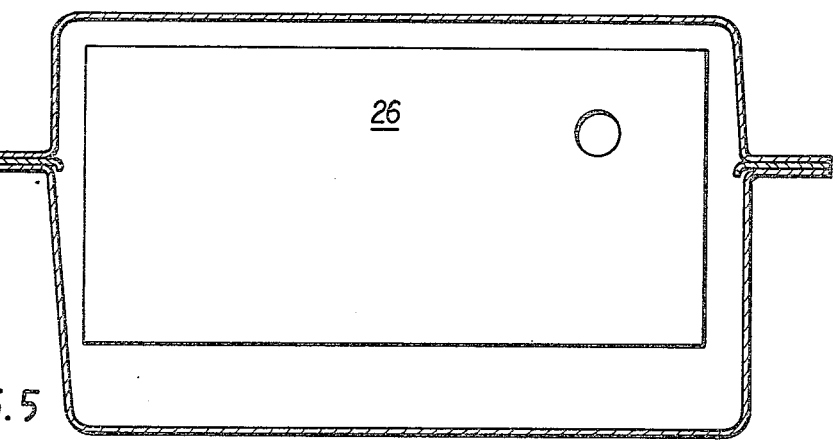
FIG. 5 is a cutaway along the plane defined by line V—V of FIG. 1.
Figures 6, 7:
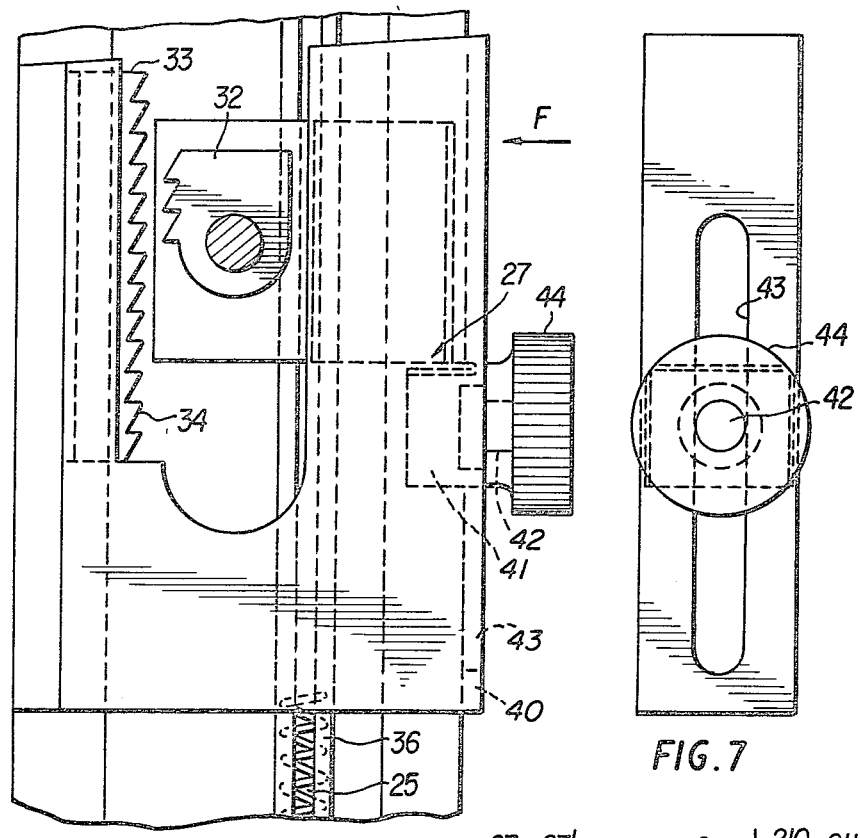
FIG. 6 is a front view of the post of the roof along the plane defined by line VI—VI of FIG. 4.
FIG. 7 is a lateral view of the roof post according to arrow F of FIG. 6.

According to FIG. 4, which shows the lateral post 4 of roof 1, it can be seen that post 4 also possesses an outer metal sheet 14 and an inner sheet 15 assembled respectively by means of connecting lips. Inner metal sheet 15 also forms the support for a closing sheet 16 which supports a number of elements whose role will be set forth below.

In FIGS. 2, 3, and 4, it can be seen that metal sheets 8, 10 and 14 which together form a continuous outer sheet, as well as sheets 9, 11 and 15 which together form a continuous inner sheet, define the frame of door 5, which forms in section a reinforcing bar 17 possessing a continuous surface 18 constituted by the end-to-end assembly of inner sheets 9, 11 and 15. Surface 18 supports a number of threaded retaining plates 19 soldered to surface 18.

One of the edges of plate 19 is located near a corresponding opening 20 of surface 18. Fastening supports 21 disposed along the frame of door 5 possess a curved retaining border 22 which engages in openings 20 and caps the adjacent edge of plate 19. Finally, a screw 23 enables rigid connection of support 21 to plate 19. The assembly of supports 21 is part of the guide support including a carrying tube 36 in which a movable part or block may slide. The block, embodied in the form of a flexible rack 25, is the carrier of anchorage 6 of the extremity of seat belt 7.

The flexible rack is mounted so as to be displaced by the action of a motor 26. The latter may be of the electrical type, of which the starting and direction reversal are dependent upon the opening and closing of door 5. By contrast, the stopping of motor 26 is conrolled, in each end position of the movable anchorage, by adjustably positioned end-of-track contacts 27, 27', activated mechanically by the support of movable anchorage 6. Anchorage 6 includes in well known fashion a fitting 28 possessing a slot for passage of the shoulder strap of seat belt 7. Fitting 28 is mounted for rotation by means of two part blocks 29, 29' on an axis 30 screwed through space washers into nut 31 soldered onto a return plate 35 rigidly connected to flexible rack 25.

So as to immobilize anchorage 6 in position, particularly following a traction force applied to the belt, the latter bears a clamp brace 32 engageable between the teeth 34 of a terminal sheet metal part 33 supported by the roof post. The terminal sheet metal part 33 extends along an adjustment band for the movable anchorage.

The apparatus may be equipped with a system for adjustment of the stop position of movable anchorage 6 when the door is closed and motor 26 stopped. The system shown in FIG. 4 is composed of terminal part 33 and a guide protrusion 40 in which moves a catch 41 carrying end-of-track contact 27 and a threaded shaft 42. Threaded shaft 42 traverses a guide aperture 43 supported by the roof post. A tightening nut 44 assures the locking of catch 41 in the position desired by the user. This arrangement thus makes the immobilization position of the movable anchorage dependent on the position of an end-of-track contact and enables the adaptation of the use position of the anchorages to the body characteristics of the user of the belt.

Figure 8:
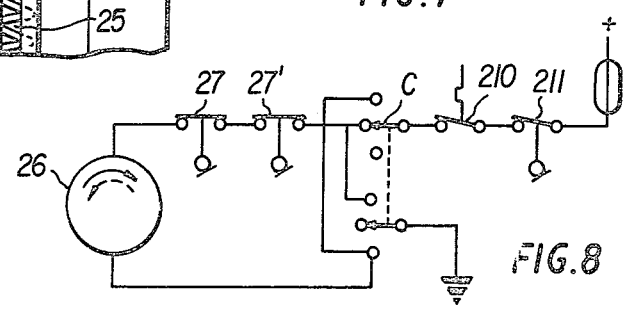
FIG. 8 is an electrical control plan of the apparatus.

FIG. 8 shows a power circuit for direct current motor 26 with permanent magnet and equipped with a reducer. The latter possesses a recocking thermic circuit breaker 210. The plus and minus poles of the motor are connected respectively to the terminals of the contacts of part c of the door, the opening and closing of which assures the starting and stopping of the motor while end-of-track contacts, 27, 27', enable stopping of the motor.

An inertial multidirectional switch 211 cuts off the circuit of the electrical motor 26 in case of a deceleration of the car of more than (1 g)—(absolute value).

A time delay of about 10 seconds can be associated to the switch 211 which inhibits the closure of the switch immediately after its opening, so that untimely displacement of the motorized anchorage in case of multiple impacts is prevented.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A seat belt restraining apparatus for an automotive vehicle having a door, said apparatus comprising:
   a door frame constituted by a reinforcing bar which defines a windshield post, a longitudinal roof reinforcing post and a lateral roof post, said reinforcing bar including inner and outer sheet means connected by longitudinal lips;
   at least one upper lateral anchorage for one end of said belt and movably fixed in said door frame;
   a lower anchorage for the other end of said belt, said belt extending laterally with respect to said door;
   a guide support for said upper lateral anchorage, said guide support supported by said inner sheet means of said reinforcing bar;
   an anchorage block element affixed to said at least one upper lateral anchorage and movable in said guide support;
   a flexible, motor driven, rack in said guide support, said anchorage block element being fixed to said rack, said guide support including a tube within which said rack slides, said guide support having longitudinally spaced fastening elements, said fastening elements being engaged in openings in said guide support;
   whereby access to a seat is automatically freed when said door is opened and said belt automatically closes over the body of the seat occupant when said door is closed.

2. The restraining apparatus of claim 1, wherein said roof post supports a clap with means for immobilization of said upper anchorage.

3. The restraining apparatus of claim 2, wherein said means for immobilization of said upper anchorage of the seat belt is supported by said clamp formed as a sheet metal part affixed to an inner wall of said roof post.

4. The restraining apparatus of claim 3, wherein said sheet metal part extends along a band for adjustment of the immobilization position of said upper anchorage when said door of the vehicle is closed.

5. The restraining apparatus of claim 4, wherein said immobilization position of said upper anchorage is dependent upon that of an end-of-track contact controlling stopping of the motor driving the flexible rack.

* * * * *